United States Patent [19]

Cook et al.

[11] Patent Number: 4,760,215
[45] Date of Patent: Jul. 26, 1988

[54] ELECTRICAL OUTLET COVER SYSTEM

[75] Inventors: Jeffrey J. Cook, 4908 E. Doubletree Rd., Paradise Valley, Ariz. 85253; Keith M. Sayre, Anaheim, Calif.

[73] Assignee: Jeffrey J. Cook, Paradise Valley, Ariz.

[21] Appl. No.: 117,506

[22] Filed: Nov. 6, 1987

[51] Int. Cl.4 ............................................. H02G 3/14
[52] U.S. Cl. ................................................. 174/67
[58] Field of Search .................... 174/67; 220/242; 439/135, 136, 142

[56] References Cited

U.S. PATENT DOCUMENTS 3,189,212  6/1965  Bellek ............................... 174/67 X
3,252,611  5/1966  Weitzman et al. ................. 220/242
3,956,573  5/1976  Myers et al. ....................... 174/67 X
4,302,624  11/1981  Newman ............................ 174/67

Primary Examiner—Arthur T. Grimley
Assistant Examiner—David A. Tone
Attorney, Agent, or Firm—Cahill, Sutton & Thomas

[57] ABSTRACT

An electrical outlet cover system having moveable covers to permit access to and to protectively cover receptacles in the electrical outlet. Each cover is hingedly connected to a plate member in a manner to permit the cover to be turned about an axis normal to the plate member to uncover the receptacle and tilted about an axis parallel to the plate member to effect engagement and disengagement of latch means for holding the cover in a position to cover the receptacle.

6 Claims, 1 Drawing Sheet

U.S. Patent        Jul. 26, 1988        4,760,215
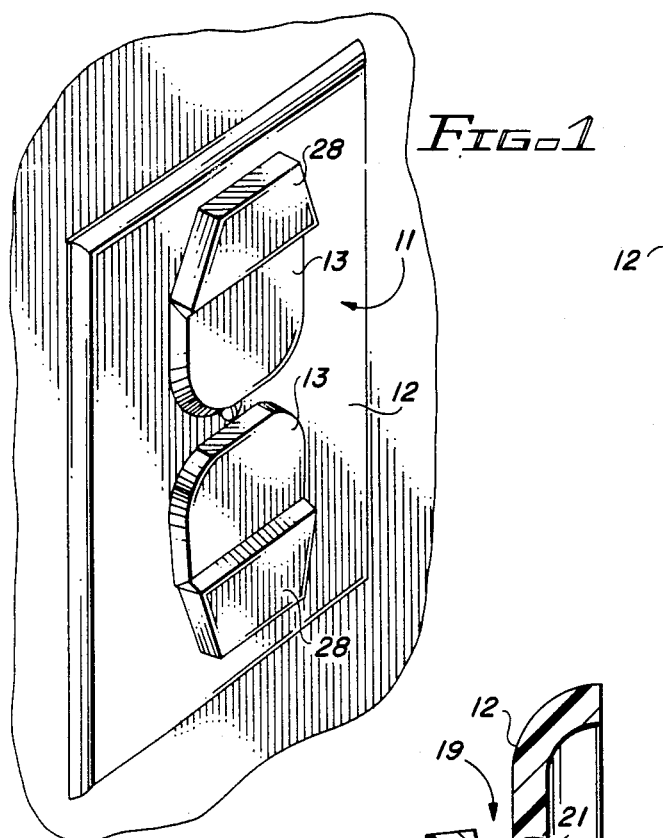
FIG-1
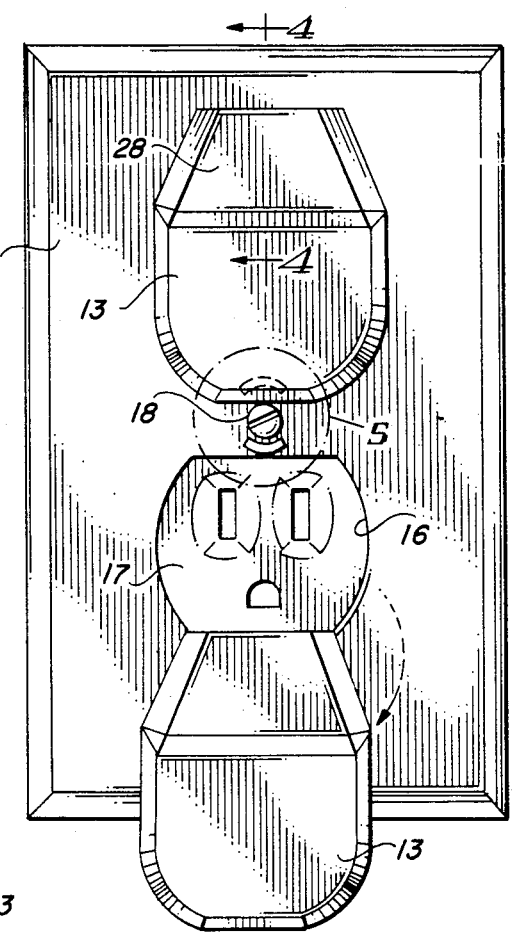
FIG-2
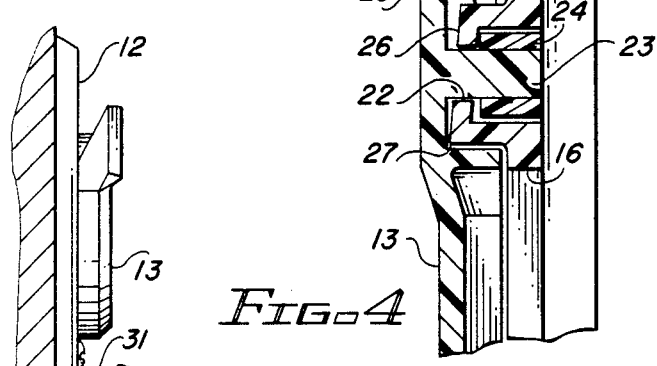
FIG-4
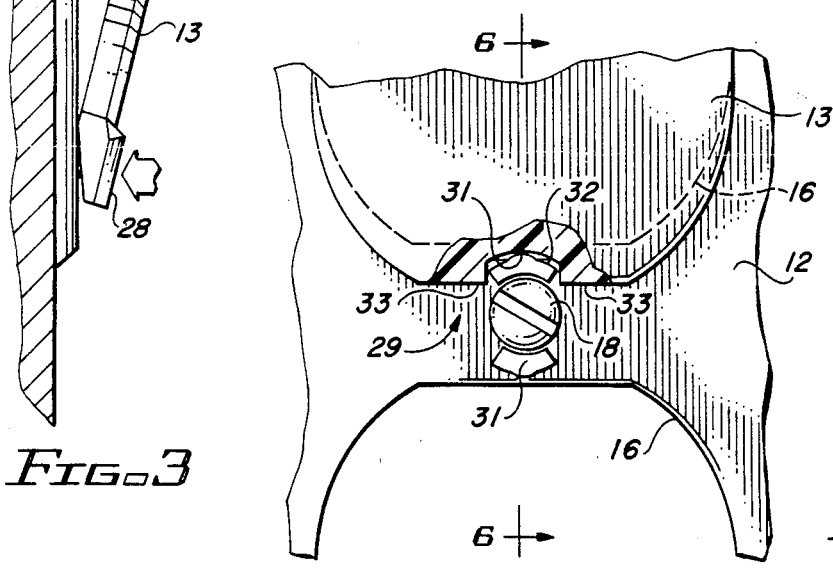
FIG-3
FIG-5
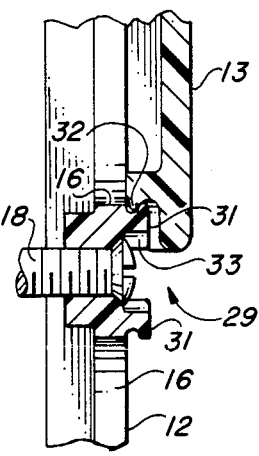
FIG-6

ELECTRICAL OUTLET COVER SYSTEM

TECHNICAL FIELD

This invention relates to wall-mounted electrical outlets of the type normally found in a residential structure and is concerned with protective and decorative covers for said outlets.

BACKGROUND ART

It has long been recognized that the electrical outlets found in the walls of residences pose hazards for small children who may attempt to insert metallic foreign objects into the receptacles of the outlets. And, so, prior inventors have devised a variety of protective covers for these outlets to discourage child access to the receptacles.

U.S. Pat. No. 4,302,624 granted Nov. 24, 1981 to F. M. Newman for "ELECTRIC WALL OUTLET PROTECTOR", is representative of prior inventive efforts in this field. The protector disclosed in this patent utilizes spring biased swinging plates to cover and uncover the electrical outlet receptacles. Although the Newman protector may be entirely satisfactory for its intended purpose, it is a fairly complex and, hence, expensive article.

To encourage people to install protective cover systems for their electrical outlets, the systems should be as simple and as inexpensive as possible. There is too the further requirement that the cover systems be attractive in appearance. Otherwise, their use will be further discouraged.

DISCLOSURE OF THE INVENTION

The cover system of this invention utilizes a plate member which replaces the decorative plate normally associated with the electricl outlet. This plate member carries a moveable cover for each receptacle in the outlet. Normally there will be two covers for the usual two receptacles.

Each cover is hingedly connected to the plate member by hinge means permitting limited tilting movement of the plate toward and away from the plate member and permitting rotation of the cover about an axis normal to the plate member to cover and uncover its receptacle. Latch means are provided for releasably holding each cover in a closed position for its receptacle. Lastly, the cover has an extension thereof projecting beyond its hinge means and away from its latch means. This extension, when pressed toward the plate member, tilts the cover away from the plate to disengage the latch means and permit the cover to be swung aside to bare the outlet receptacle.

BRIEF DESCRIPTION OF THE DRAWING

The invention is described in greater detail hereinafter by reference to the accompanying drawing wherein:

FIG. 1 is a perspective view from above of an electrical outlet cover system embodying this invention;

FIG. 2 is a front elevational view of the cover system of FIG. 1, with one of the covers moved to an open position to expose an electrical outlet receptacle;

FIG. 3 is a side elevational view of the cover system with latch means for one of the covers disengaged;

FIG. 4 is an enlarged, partial vertical sectional view through the hinge means of one of the covers, the view being taken generally as indicated by line 4—4 in FIG. 2;

FIG. 5 is an enlarged fragmentary view of the region encircled by line 5 in FIG. 2 with portions broken away to reveal latch means for the cover; and FIG. 6 is a vertical sectional view taken generally as indicated by line 6—6 in FIG. 5.

BEST MODE FOR CARRYING OUT THE INVENTION

Referring particularly to FIG. 1, the numeral 11 designates a cover system constructed in accordance with this invention and adapted to be used in conjunction with a wall mounted electrical outlet of the type commonly used in residential structures.

The cover system 11 comprises a plate member 12 which is configured much like and is intended to replace the metal or plastic decorative cover normally associated with the electrical outlet. The cover system 11 is designed to be used with a dual receptacle outlet and is, therefore, provided with two covers 13.

Each of the covers 13 is designed to cover and uncover an opening 16 in plate member 12. Openings 16, when uncovered, expose receptacles 17 forming part of the electrical outlet.

Plate member 12 of cover system 11 is preferably secured to the electrical outlet by the same conventional means used to hold the decorative plate in place on the outlet, namely, a screw 18 passing through an opening in plate member 12 and engaging a threaded opening (not shown) in the electrical outlet.

Each cover 13 is mounted on plate member 12 by hinge means illustrated in FIG. 4 and indicated generally by reference number 19. Hinge means 19 is intended to permit bi-axial pivoting movement of covers 13. The first degree of movement permitted is rotational movement about an axis normal to the plane of plate member 12 by which the covers can be moved from the closed position occupied by upper cover 13 in FIG. 2 to the open position occupied by the lower cover 13 in that same figure. The second degree of movement permitted of each cover 13 by hinge means 19 is a tilting movement about an axis generally parallel to the plane of plate member 12 for the purpose of latching and unlatching the covers to the plate member as will be described in greater detail hereinafter.

Referring particularly to FIG. 4, hinge means 19 comprises a hollow boss 21 projecting away from the face of plate member 12 in the direction of each of the covers 13. Boss 21 has an opening 22 therein for loosely receiving a pin 23 protruding from the inner face of cover 13. Cover 13 is held in place on plate member 12 by a cylindrical ferrule 24 secured to the distal end of pin 23. Ferrule 24 fits loosely within the hollowed out portion of boss 21 so as to permit rotational and tilting movement of pin 23 within boss 21.

It will be noted that the surface 26 at the distal end of boss 21 is at an angle with respect to the plane of plate 12. The highest region of surface 26 is disposed adjacent plate member opening 16 and constitutes a fulcrum 27 about which cover 13 can be pivoted. Cover 13 has an extension 28 which extends beyond hinge means 19 toward the edge of plate member 12 when cover 13 is in its closed position as illustrated in FIG. 4. By pressing this extension 28 of cover 13 toward plate member 12 it is possible to tilt cover 13 about fulcrum 27 on boss 21 to cause the portion of cover 13 which extends over opening 16 to lift away from plate member 12. Again, the looseness with which pin 23 and ferrule 24 are held within the hollow boss 21 permits the second degree of movement of the cover 13.

This tilting movement of cover 13 is utilized to effect disengagement of latch means for the covers 13. That latch means is illustrated in FIGS. 5 and 6 and is indicated generally by the reference numeral 29.

Latch means 29 is utilized to hold covers 13 in their closed positions and to discourage accidental movement of the covers away from those positions. A best shown in FIGS. 5 and 6, the latch means includes a catch member 31 protruding from the face of plate member 12 and adapted to releasably hold a protuberance 32 formed on the inner face of cover 13. There is sufficient flexibility in either the catch member 31 or protuberance 32, or both and their supporting structures to permit a cover 13 to be snapped free of the interference between catch member 31 and protuberance 32 to permit a cover 13 to be tilted away from the surface of plate 12.

So long as cover 13 is held against plate member 12 by the interference of catch member 31 and protuberance 32 of latch means 29, rotation of cover 13 is prevented by a pair of stop members 33 positioned on opposite sides of and closely confining catch 31. Only after the latch region of cover 13 is lifted free of catch member 31 is it permissible to rotate cover 13 about pin 23 to an open position exposing a receptacle 17 of the electrical outlet.

Of course, the latch means for the lower cover 13 is identical to latch means 29 described above by reference to the upper cover 13.

The extension 28 of each cover 13 is preferably raised slightly with respect to the remainder of the cover as shown in FIGS. 1 and 3. This calls attention to the extension and gives the adult user an indication of where to press the cover to effect disengagement of latch means 29.

The cover system 11 of this invention is preferably injection molded of a plastic material such as, for example, polystyrene. The design of the cover system 11 described above and illustrated in the drawings is such that all of the components of the cover system are preferably made of the same material and therefore can be molded in a single multiple cavity mold. Moreover, components made from plastic, such as polystyrene have a degree of flexibility which permits the latch means 29 to be engaged and disengaged.

The cover system 11 is simple and inexpensive. For example, the cover system 11 of this invention consists of a mere five molded plastic components. Assembly of these components is also simple. Each cover 13 is assembled to plate member 12 by inserting its pin 23 into one of the bosses 21 and affixing the ferrule 24 to the ends of the pin 23. Securement of the plastic ferrules 24 on the plastic pins 23 can be accomplished by applying a drop of adhesive or by applying a heated member to seal the end of the pin 23 to its respsective ferrule 24. That completes assembly of the article.

Subsequent attachment of the cover system 11 to the electrical outlet is, of course, by means of standard attachment screw 18 which is normally already associated with the electrical outlet, having been used to hold the decorative cover in place.

From this it can be appreciated that the manufacture, assembly and attachment of the cover system 11 of this invention all contribute to the economics and ease of use of the cover system.

What is claimed is:

1. In the cover system for an electrical outlet, a plate member having an opening therein for access to a receptacle in the electrical outlet, means for securing said plate member to said electrical outlet, a moveable cover mounted on said plate and adapted to close and open said opening, the mounting means for said cover comprising hinge means positoned alongside said opening for permitting limited tilting movement of the cover toward and away from said plate and permitting rotation of said cover about an axis normal to said plate member to uncover said opening, and latch means positioned alongside said opening in a region of the plate opposite said hinge means, said latch means releasably holding said cover in a position over said opening, said cover having an extension thereof projecting beyond said hinge means away from said latch means and which when pressed toward said plate member tilts said cover about said hinge means to disengage said latch means.

2. The cover system of claim 1 wherein said hinge means comprises a boss protruding from a surface of said plate member toward said cover, said boss having an opening therethrough, and a pin protruding from said cover and loosely received in the opening in said boss.

3. The cover system of claim 2 wherein said boss has its distal end sloping with respect to said plate member to facilitate tilting movement of said cover.

4. The cover system of claim 1 wherein said latch means comprises a catch member protruding from a face of said plate member toward said cover, said cover having a protuberance thereon adapted to be releasably held by said catch member, and stop members on said cover on either side of said protuberance and engagable with said catch member for preventing rotation of said cover when the protuberance is held by said catch member.

5. The cover system of claim 4 wherein one or the other of said catch member and said protuberance is made of resilient material whereby tilting movement of said cover snaps said protuberance free of said catch member.

6. The cover system of claim 1 wherein the extension of the cover is raised with respect to the remainder of the cover.

* * * * *